April 30, 1940.   L. F. CARTER ET AL   2,199,024
TEMPERATURE COMPENSATION FOR GYROSCOPES
Filed Jan. 27, 1939
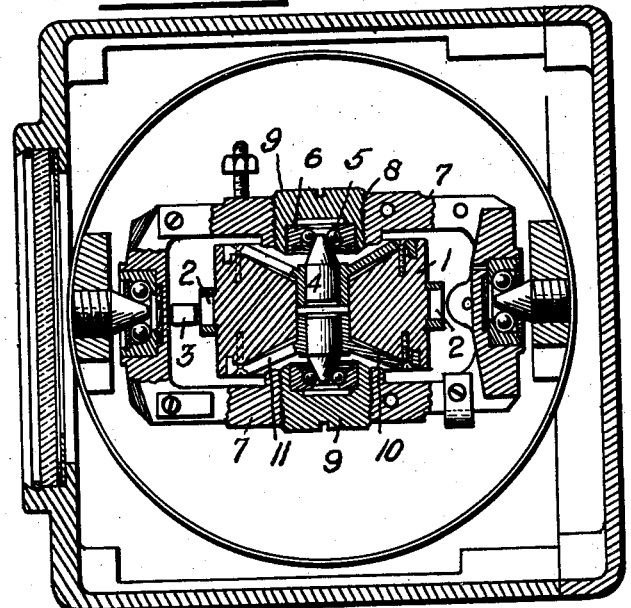
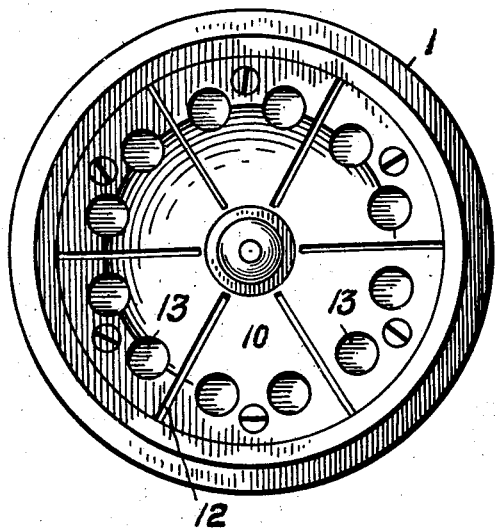
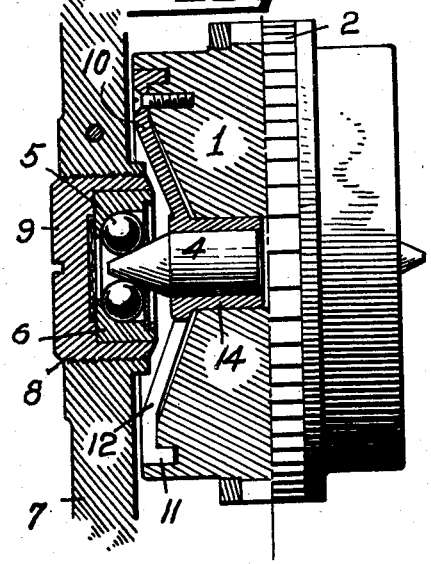
INVENTORS
LESLIE F. CARTER and
BRUNO A. WITTKUHNS
BY Herbert H. Thompson
THEIR ATTORNEY

UNITED STATES PATENT OFFICE 2,199,024

TEMPERATURE COMPENSATION FOR GYROSCOPES

Leslie F. Carter, Leonia, and Bruno A. Wittkuhns, Summit, N. J., assignors to Sperry Gyroscope Company, Inc., Brooklyn, N. Y., a corporation of New York Application January 27, 1939, Serial No. 253,112

9 Claims. (Cl. 74—5)

This invention relates to gyroscopic instruments and refers more particularly to such instruments used as navigational aids on aircraft, for example, directional gyroscopes and artificial horizons, in which great precision is necessary. Instruments of this type usually have a small air-driven rotor mounted on a shaft running in conical or "cup" anti-friction bearings, the bearings being held in an outer housing or ring. The fit between the shaft and bearings is precisely adjusted to the proper degree of freedom, and it is essential that this adjustment be maintained under all operating conditions.

Since it is necessary to keep the weight of aircraft instruments as low as possible, the housing in which the anti-friction bearings are mounted is usually made of an aluminum alloy, whereas the rotor shaft is made of hardened steel to secure a suitable bearing surface. These two metals have different thermal coefficients of expansion and as a consequence changes of temperature produce differential displacements which may appreciably change the bearing adjustment. The rotor itself is usually made of brass, which has a coefficient of expansion different from the other two parts. Aircraft instruments are subject to a wide variation of operating temperature, particularly when used on aircraft that ascend to high altitudes and it is found that at the low temperatures encountered at high elevations, because of the differential contraction between the bearing housing and shaft, the rotor bearings may become unduly tight or "freeze."

One method of maintaining constant bearing freedom is to provide means for producing a displacement of the bearings opposite to the displacement produced by the expansion or contraction of the aluminum housing (Bates, U. S. Patent No. 2,047,186). This compensates for the differential expansion between the shaft and the bearings but there is still present a differential expansion between the shaft and the rotor along their common axis for the reasons stated. As the rotor is usually pressed on the shaft and held by friction, repeated expansions and contractions may cause the rotor to shift axially or "creep" along the shaft. For the proper operation of a gyroscopic instrument the mass center of the rotor should be on the axis about which the rotor bearing ring swivels and the possibility of a displacement of this mass center is highly undesirable.

According to our invention, we propose to mount the rotor on a shaft which is split into two parts instead of on a solid shaft, as has heretofore been customary, and to flexibly support the rotor on these two pivot shafts by means of dished or cone-shaped plates of a material having a low thermal coefficient of expansion. These plates are designed to move the pivot shafts axially as the rotor expands or contracts circumferentially and by a suitable choice of the angle of the cone, the differential displacement between the shaft ends and the bearings which would otherwise occur as the temperature of the instrument changes, may be exactly compensated for and the correct bearing freedom maintained. Furthermore, because the two ends of the rotor are independently and flexibly supported, expansion of the rotor along its axis will be symmetrical with respect to its initial position and the mass center will not be shifted.

Although our invention has been described in connection with a particular class of instruments, it is obviously applicable to other instruments having rotating parts whose operation is adversely affected by wide temperature variations.

Referring to the drawing, showing the preferred form of our invention,

Fig. 1 is a section of a gyro rotor and rotor bearing ring with the bearing constructed in accordance with our invention.

Fig. 2 is an elevation of the rotor, showing one of the conical pivot plates in position.

Fig. 3 is a partial plan view showing the rotor and one bearing in detail.

The particular gyroscope selected for illustration is one in which the rotor 1 may be air-driven by means of buckets 2 on the periphery thereof, against which air from an air jet in tube 3 strikes. Obviously, however, our invention is not limited to any particular form of rotor spinning means. The rotor is usually made of a heavy metal, such as brass, while pivot shaft 4 is of hardened steel to provide a long life bearing. The shaft is shown as tapered at its ends to engage the balls 5 of anti-friction bearing 6 in the rotor bearing ring 7, thus providing a combined radial and thrust bearing, sometimes termed a cup bearing.

The rotor bearing ring, which causes end play or lost motion when it expands or contracts, is preferably made of aluminum alloy for the sake of lightness and is provided with a large threaded aperture 8 at each side, in which is threaded a thimble 9, which holds the bearing and provides means both for centering the rotor with respect to the gimbal bearings and for precisely adjusting the freedom of the rotor bearings. The ends of the rotor 1 have depressions slightly deeper than those of the conical pivot plate 10. One pivot plate is attached to each end of the rotor and the periphery of the plate constrained to follow the expansion and contraction of the rotor by a flange 11 set into a groove in the rotor. A plurality of radial slots 12 in pivot plate 10 allows these changes to take place freely. Preferably, plate 10 has also a plurality of holes 13 to decrease its stiffness at the section of greatest flexure. A hub 14 on pivot plate 10, which fits closely in a hole in the rotor without appreciable radial clearance, is free to move axially with respect to the rotor. Pivot shaft 4 is pressed into the hub and forms an integral part of it.

The operation of our bearings in compensating for temperature changes is as follows. Assuming that the parts have been adjusted for ordinary temperatures and that the instrument is then subjected to a very low temperature, the ring 7 will contract much faster than the two pivot shafts 4, thus tending to draw the bearings inwardly. At the same time, however, rotor 1 contracts circumferentially thereby decreasing the circumference of pivot plate 10, and causing pivot shaft 4 to move inwardly. Since pivot plate 10 is preferably of a metal having a low thermal coefficient of expansion, this inward motion of the pivot shaft is only slightly affected by the contraction of the plate. By suitable choice of the conical angle of pivot plate 10 the displacement of pivot shaft 4 due to the circumferential contraction of the rotor may be made exactly the same as the displacement of the bearing due to the contraction of the bearing ring. Because the rotor is supported on the two part shaft by symmetrical flexible mountings, axial expansions and contractions of the rotor will not shift its mass center off the axis of the rotor bearing ring gimbal bearings.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described our invention, what we claim and desire to secure by Letters Patent is:

1. In a gyroscope, a rotor and a two part shaft therefor, each part being shiftable within said rotor and with normally a clearance between the inner ends of said parts and resilient means for maintaining said parts symmetrically positioned with respect to said rotor.

2. In a gyroscope, a rotor, a two part shaft therefor axially shiftable therein, and means for axially positioning said parts of said shaft with respect to each other in response to dimensional changes of the rotor.

3. In a gyroscope, a rotor, a two part shaft therefor axially shiftable therein, and means connecting said rotor and shaft, said means producing an axial effective contraction and elongation of the shaft in response to circumferential dimensional changes of the rotor.

4. In a gyroscope, a rotor, a two part shaft therefor axially shiftable therein, and flexible means connecting said rotor and shaft, said flexible means being deformable by dimensional changes of the rotor, thereby producing axial displacement of the shaft.

5. In a gyroscope, a rotor, a two part shaft therefor axially shiftable therein, and flexible members having substantially the form of hollow cones connecting the two rims of the rotor and two parts of said shaft, each conical member having its outer section attached to the rotor and capable of changing its position therewith and having its inner section attached to one part of the shaft, whereby said part is moved axially on expansion of the rim of the rotor.

6. In a gyroscopic indicator, the combination with a rotor having a two part rotor shaft and rotor shaft bearing ring having different coefficients of expansion, of means responsive to expansion and contraction of said rotor for axially positioning the two parts of the shaft to maintain a predetermined degree of freedom in the rotor bearings regardless of large variations in temperature.

7. In a gyroscopic indicator, the combination with a rotor and rotor bearing ring having different coefficients of expansion, of a two part shaft for the rotor and means actuated by dimensional changes of the rotor for positioning the two parts of the shaft to compensate for the differential expansion of the shaft bearing ring and rotor.

8. In a gyroscopic indicator, the combination with a rotor, a two part shaft therefor, said rotor having a higher coefficient of expansion than the shaft, and a rotor bearing ring having a high coefficient of expansion, of flexible means for mounting the rotor on the shaft, said flexible means being deformable and producing a displacement of the shaft as the rotor expands or contracts circumferentially.

9. In a gyroscopic indicator, the combination with a rotor, a two part shaft therefor and axially shiftable therein, having a lower coefficient of expansion than the rotor and a rotor bearing ring carrying anti-friction rotor bearings and having a relatively high coefficient of expansion, of flexible plates having a low coefficient of expansion connecting the shaft and the rotor and having substantially the form of hollow cones, each plate being attached adjacent its outer end to the rotor and adjacent its inner end to one part of the shaft, the taper of the cone being such that a change in the circumference of its base due to expansion or contraction of the rotor under temperature changes will produce an axial shift of the shaft equal to the differential expansion between the shaft and bearing ring housing with temperature changes.

LESLIE F. CARTER.
BRUNO A. WITTKUHNS.